US009462441B2

(12) United States Patent
Dowlatkhah et al.

(10) Patent No.: US 9,462,441 B2
(45) Date of Patent: Oct. 4, 2016

(54) METHOD AND APPARATUS FOR DYNAMICALLY MANAGING USER PROFILES AND STATUS CHANGE INFORMATION

(71) Applicant: AT&T Intellectual Property I, LP, Atlanta, GA (US)

(72) Inventors: Sangar Dowlatkhah, Alpharetta, GA (US); Venson Shaw, Kirkland, WA (US); Afsaneh Khajavi, Los Angeles, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 136 days.

(21) Appl. No.: 14/320,749

(22) Filed: Jul. 1, 2014

(65) Prior Publication Data
US 2016/0007173 A1  Jan. 7, 2016

(51) Int. Cl.
| H04M 3/42 | (2006.01) |
| H04W 4/20 | (2009.01) |
| G06Q 50/00 | (2012.01) |
| H04W 4/02 | (2009.01) |

(52) U.S. Cl.
CPC ............. *H04W 4/206* (2013.01); *G06Q 50/01* (2013.01); *H04W 4/023* (2013.01)

(58) Field of Classification Search
CPC ..... H04W 4/206; H04W 4/023; G06Q 50/01
USPC .......... 455/414.1; 709/238; 725/34
See application file for complete search history.

(56) References Cited

U.S. PATENT DOCUMENTS

| 7,554,522 B2 | 6/2009 | Sinclair, II et al. |
| 7,624,336 B2 | 11/2009 | Crawford et al. |
| 7,912,926 B2 | 3/2011 | Belgaied et al. |
| 8,639,650 B1 | 1/2014 | Gill |
| 2002/0016830 A1 | 2/2002 | Nicolai |
| 2009/0049190 A1* | 2/2009 | Jiang ..................... H04L 12/581 709/238 |
| 2011/0026704 A1 | 2/2011 | Connelly et al. |
| 2011/0144989 A1 | 6/2011 | Dowlatkhah |
| 2011/0298618 A1 | 12/2011 | Stahl et al. |
| 2012/0233103 A1 | 9/2012 | Ashrafi |
| 2012/0278825 A1 | 11/2012 | Tran et al. |
| 2014/0129242 A1 | 5/2014 | Utter, II |

(Continued)

FOREIGN PATENT DOCUMENTS

| WO | 2009054661 A1 | 4/2009 |
| WO | 2009080377 A1 | 7/2009 |

OTHER PUBLICATIONS

Esler, Mike et al., "Next Century Challenges: Data-Centric Networking for Invisible Computing", ACM, 1999, 256-262.
Hess, Christopher K. et al., "Building applications for ubiquitous computing environments", Pervasive Computing, Springer Berlin Heidelberg, 2002, 309 pages.

*Primary Examiner* — Amancio Gonzalez
(74) *Attorney, Agent, or Firm* — Guntin & Gust, PLC; Robert Gingher

(57) ABSTRACT

Aspects of the subject disclosure may include, for example, receiving status change information from a first communication device of a first user over a network; adjusting a user profile of a second user responsive to the status change information; and providing the status change information to a group of second communication devices of the second user to cause the group of second communication devices to adjust operational parameters according to the status change information. Other embodiments are disclosed.

17 Claims, 7 Drawing Sheets

(56) References Cited

U.S. PATENT DOCUMENTS

| | | |
|---|---|---|
| 2014/0129569 A1 | 5/2014 | Seeger, III et al. |
| 2014/0136233 A1 | 5/2014 | Atkinson et al. |
| 2014/0136441 A1 | 5/2014 | Agarwalla et al. |
| 2014/0136616 A1 | 5/2014 | Smith, IV et al. |
| 2014/0136624 A1 | 5/2014 | Abhyanker |
| 2014/0143665 A1 | 5/2014 | Hauser et al. |
| 2014/0337883 A1* | 11/2014 | Foote ............... H04N 21/44222 725/34 |

* cited by examiner

100

200

300

METHOD AND APPARATUS FOR DYNAMICALLY MANAGING USER PROFILES AND STATUS CHANGE INFORMATION

FIELD OF THE DISCLOSURE

The subject disclosure relates to a method and apparatus for dynamically managing user profiles and status change information.

BACKGROUND

The communication demands of users are constantly changing. Devices and applications for those devices are changed in an attempt to accommodate the users. However, given the broad range of services and the rapid rate at which technology is advancing, it is often difficult for device manufacturers and software developers to keep pace.

BRIEF DESCRIPTION OF THE DRAWINGS

Reference will now be made to the accompanying drawings, which are not necessarily drawn to scale, and wherein.

DETAILED DESCRIPTION

Figure 1:
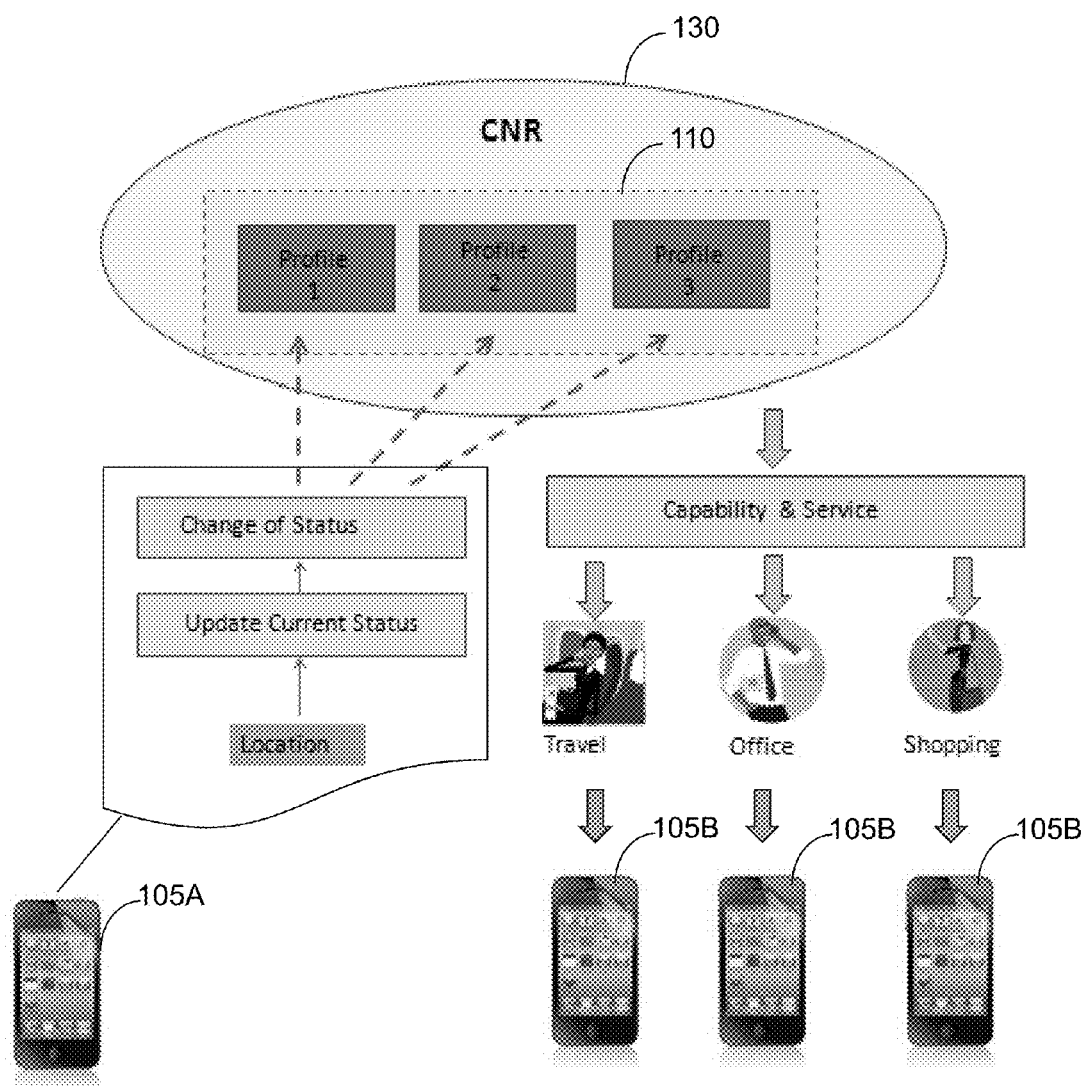
FIGS. 1-3 depict illustrative embodiments of systems for dynamically managing user profiles and status change information for a group of devices of a user.

The subject disclosure describes, among other things, illustrative embodiments for dynamically managing and/or updating user profiles and status change information. In one or more embodiments, a dynamic Central Network Repository (CNR) profile system is provided that enables the CNR to automatically detect, follow and/or update a current status of a user without user intervention. Other embodiments are described in the subject disclosure.

The exemplary systems and methods can adjust the status of a user in a CNR, automatically push features associated with the status change and applications associated with the status change to devices of the user, and/or automatically push or otherwise adjust the user's preferred settings to the user's device(s). The exemplary systems and methods can also utilize third party devices for determining status change information associated with a user and/or analyze status change information to determine the accuracy of a determination of a status change. The exemplary embodiments can be used with various communication systems, including a Long Term Evolution (LTE) network.

In one or more embodiments, various user devices (e.g., mobile smart devices, desktop computers, set top boxes, Internet Protocol (IP) enabled security system, air-conditioning systems, iGlasses, iWatches, IP enabled appliances, IP enabled medical devices, and other IP enabled devices) can be connected to certain services registered in their perspective profile in the CNR. The systems and methods provide dynamic and/or automatic interaction between these different services and different devices without requiring a user's interaction.

The type of interaction can vary such as changes to a certain parameter in the user profile triggered by a sensor in a user's connected device (e.g., Global Positioning System (GPS) in the phone indicating the user's new location such as different City) or adding a new ability to the user's profile by his or her interaction with newly purchased device and/or services. These status changes can be registered or otherwise indicated in the user's profile stored in the CNR and can be propagated to all related services for the user, as well as pushed down to all user devices associated with the services without any user intervention. The user devices can be devices that are registered to a particular user (e.g., a subscriber of the device), as well as devices that the user interacts with such as a set top box where the user is a family member that routinely utilizes the set top box (even though the set top box may be registered to another family member).

One embodiment of the subject disclosure is a method that includes receiving, by a system including a processor, status change information from a first communication device of a first user over a network, where the status change information is determined by the first communication device, where the status change information is associated with a second user, and where the first communication device is not associated with the second user. The method can include adjusting, by the system, a user profile of the second user responsive to the status change information, where the user profile is stored in a memory accessible to the system. The method can include providing, by the system, the status change information to a group of second communication devices corresponding with the second user to cause the group of second communication devices to adjust operational parameters according to the status change information, where the adjusting of the user profile of the second user and the providing of the status change information to the group of second communication devices is performed without user intervention by the second user.

One embodiment of the subject disclosure includes a first communication device having a processor and a memory that stores executable instructions that, when executed by the processor, facilitate performance of operations including detecting a second communication device of a second user in proximity to the first communication device. The operations include determining status change information based on the detecting of the second communication device and based on a type of first communication service being provided by the first communication device at a time of the detecting of the second communication device. The operations include providing the status change information over a network to a server, where the status change information is associated with the second user, where the first communication device is not associated with the second user. The providing of the status change information to the server causes the server to adjust a user profile of the second user according to the status information and causes the server to provide the status change information to a group of second communication devices of the second user to enable adjusting operational parameters according to the status change information. The adjusting of the user profile of the second user and the providing of the status change information to the group of second communication devices is performed without user intervention by the second user.

One embodiment of the subject disclosure includes a machine-readable storage medium, including executable instructions that, when executed by a processor of a second communication device, facilitate performance of operations. The operations include providing communication signals that enable a first communication device to detect the second communication device in proximity to the first communication device, where a detection of the second communication device in proximity to the first communication device causes the first communication device to determine status change information for a second user of the second communication device, and where a determination of the status change information causes the first communication device to provide the status change information to a server for adjusting a user profile of the second user according to the status information and for providing the status change information to a group of second communication devices of the second user to enable adjusting operational parameters according to the status change information. The operations include providing verification information to the server without user intervention by the second user, where the providing of the verification information causes the server to determine an accuracy of the status change information associated with the second user that was determined by the first communication device. The adjusting of the user profile of the second user and the providing of the status change information to the group of second communication devices is performed responsive to a determination by the server that the status change information associated with the second user is accurate.

FIG. 1 depicts an illustrative embodiment of a system 100 that enables dynamic management of user profiles and status change information. The system can include a CNR 130 that stores or otherwise has access to user profiles 110. In this example, sub-profiles one, two and three are illustrated for a single user profile 110 of a user. The CNR 130 can store or otherwise have access to any number of user profiles and/or any number of sub-profiles for any number of users. The exemplary embodiments can also create or otherwise store a profile for more than one user, such as a residence profile, a family profile, a friends profile, a work profile, a travel profile, a vacation profile and so forth, where the profiles are associated with more than one user. The sub-profiles can be associated with different personas of the user. For instance, the sub profiles can be individually indexed to a work persona, a home persona, a vacation persona, a business travel persona, and so forth.

System 100 enables communication of status change information from end user device(s), such as mobile smart phone device 105A, to the CNR 130 so that the profile 110 can be adjusted and the status change information (or a portion thereof) and/or the profile adjustment can be delivered to other devices 105B of the user. The example illustrates a mobile smart phone device 105A, however, the exemplary embodiments can be various types of user devices including mobile smart phones, laptop computers, desktop computers, set top boxes, residential gateways, Personal Digital Assistants (PDAs), smart appliances, security systems, medical devices, and other devices of the user that have communication capabilities.

Various network elements (not shown) can be utilized to facilitate the communications, including routers, switches, digital subscriber line access multiplexers (DSLAMs), service area interfaces, fiber optical links, copper twisted pairs, and so forth. The communication of the status change information from the mobile device 105A to the CNR 130 can be via a wireless link and/or a wired link. The particular access technologies utilized for communicating the status change information can vary.

In this example, the status change information is associated with a location of the user, such as a change of location (e.g., from one city to another city) or the particular location (e.g., a library). For instance, the status change information determined by device 105A is that the user has entered the location of Atlanta. This status change information can be communicated from device 105A to the CNR 130 without user intervention. The CNR can update the profile 110 (e.g., a work profile, a travel profile, and/or a shopping profile) of the user which can be associated with various device capabilities and services. The location change into Atlanta and/or the profile updates (including changes to available device capabilities and device services) can be communicated to the user's other devices 105B. As an example, the location change can be to a restaurant in Atlanta that has free WiFi access. This location status change information can result in one or more of the devices 105B of the user establishing connections via the free WiFi access because the devices 105B have been made aware of the newly available service via the CNR updating of the profile 110 and distribution of the information to the devices 105B. The illustration of FIG. 1 depicts devices 105B as being mobile devices, however in this example, the devices 105B can be a laptop computer, a PDA, iGlasses, iWatch, a medical device, a vehicle communication system and other devices of the user that have communication capabilities. Additionally the devices 105B of the user can be located at various locations which may or may not be in proximity to the user. For instance continuing with this example, the location change information to the restaurant in Atlanta can result in a security system of the user 105B changing security settings applicable to when the user is away from the home or can result in a shopping service being enabled for particular shops in the vicinity of the restaurant in Atlanta.

System 100 can engage smart devices of a user (e.g., a mobile smart phone, a smart watch, smart glasses, and so forth) to act as an agent or broker to communicate with the CNR 130 in order to update the change of status for the user (e.g., a location change, an activity change, a preference change and so forth). The devices 105A and/or 105B can be devices that are registered to the user or other devices that are associated with the user, such as devices that the user utilizes (e.g., a work computer or a family set top box). In one embodiment, appropriate parameters and flags can be included within applications and/or the smart devices to facilitate and enable dynamic updating of status changes which can result in an update or adjustment to the capability of the applications and/or devices 105B of the user. In one embodiment, communication between the smart devices and the CNR 130 allow the CNR to be aware of the status change of the user and to push the appropriate parameter(s) to the applications and smart devices 105B to enable the update or adjustment of the device capabilities. In another embodiment, adjustable parameters of applications of the user's devices 105A and 105B can be known to the CNR 130 so that any new application can be compared with existing applications to determine if there are corresponding parameters in common for which profile updates can occur. This comparison can be performed by the user device(s) and/or by the CNR 130.

System 100 provides an integrated CNR-Smart Device-Smart Device Application Service which can be dynamically adjusted according to the change of user status, user activity, user preference, user location, and so forth. In one embodiment, responsive to the status of a user changing, the CNR 130 receives status change information, such as from the device 105A, from another device of the user that detects or otherwise determines that the status of the user has changed, and/or from a third party device that detects or otherwise determines that the status of the user has changed. The CNR 130 can automatically update the user's profile according to the change of user status.

In one embodiment, the CNR 130 can determine the accuracy of the status change information. For instance, the source of the status change information can be considered in determining the accuracy of the status change information. Data received from other devices (e.g., other devices of the user or other third party devices) can also be considered in determining the accuracy of the status change information, such as comparing data (e.g., associated with the status change information) that is received from different devices (e.g., other devices of the user or other third party devices) to determine a correlation with the status change information.

In one embodiment, the CNR 130 can instruct or otherwise request that an application server automatically push a service (e.g., email, music, and so forth) and/or push capabilities to one or more devices 105B of the user, which can be various types of devices including mobile smart phones, laptop computers, desktop computers, set top boxes, residential gateways, PDAs, smart appliances, security systems, medical devices, and other devices of the user that have communication capabilities. In this example, the user does not need to switch devices when the status is changed.

System 100 enables a set of parameters, which are common between certain applications of the user's devices, to be dynamically changed once a certain triggering event occurs, such as a location update on a phone or changing equipment from one capable device to another more capable device. In one embodiment, the set of parameters can be stored by the CNR 130 in the user profile so that new devices and/or new applications of the user can be analyzed to determine if they include any of the parameters.

In one embodiment, the CNR 130 can push or otherwise deliver profile updates (according to the status change information) to multiple profile locations for the user where profiles are stored locally, such as at the user's mobile smart phone and/or at the user's set top box. In one embodiment, flags can be set in each application or local profile to trigger a parameter update to be pushed from the CNR 130 to relevant applications or for relevant services of the user. For instance, if a user has changed equipment (the status change) that is capable of displaying in a larger screen or utilizing a higher bandwidth, system 100 enables changing the codec, display resolution, bandwidth, etc. and providing richer content according to the communication of the status change information to the end user devices, as well as to network elements that control services for the end user devices.

In one embodiment, all profiles for the user can be consistently updated according to the status change information. In another embodiment, there can be a user preferred ability to control, enable, and/or or disable changes if desired. In another embodiment, security measures can be applied to ensure privacy such as limiting the type of status change information that is being distributed.

In one embodiment, the device 105A can communicate with the CNR 130 via Bluetooth or Wi-Fi communications. The communication and updates of parameters can be seamlessly performed via numerous methods such as a smart watch, smart glasses or smart key to enable one or more of the devices 105B of the user to be notified of the status change and have updated profiles in the CNR 130.

In one embodiment, one or more of the devices 105B can pull profile updates from CNR 130, such as via Bluetooth or Wi-Fi communications. System 100 can enable both a push and pull distribution of status change information and/or profile updates for the end user devices.

In one or more embodiments, responsive to the profile adjustment based on the status change information and responsive to service adjustments made by the network, smart devices that the user interacts with can benefit from user preferences detected from the profile adjustment such as TV settings in a hotel or a thermostat setting in the user's vacation residence. In one or more embodiments, a user device can toggle between multiple profile locations according to a detected status change which may be communicated directly with other user devices. For instance, the smart devices can be set to behave differently after communicating with another device of the user (e.g., via Near Field Communication (NFC)) such as where a user enters his summer home with a mobile device 105A and the other devices 105B at the summer home communicate with mobile device to adjust their profile from an away state to a home state resulting in changes to the device parameters.

In one or more embodiments, the status for the user can include multiple parameters (e.g., location, marital status, and so forth). The Smart devices can be set to behave differently once the location and/or marital status are changed. In one or more embodiments, the user can set preferences so that certain parameters of the user's devices and/or of the user's applications receive higher priority.

Figure 2:
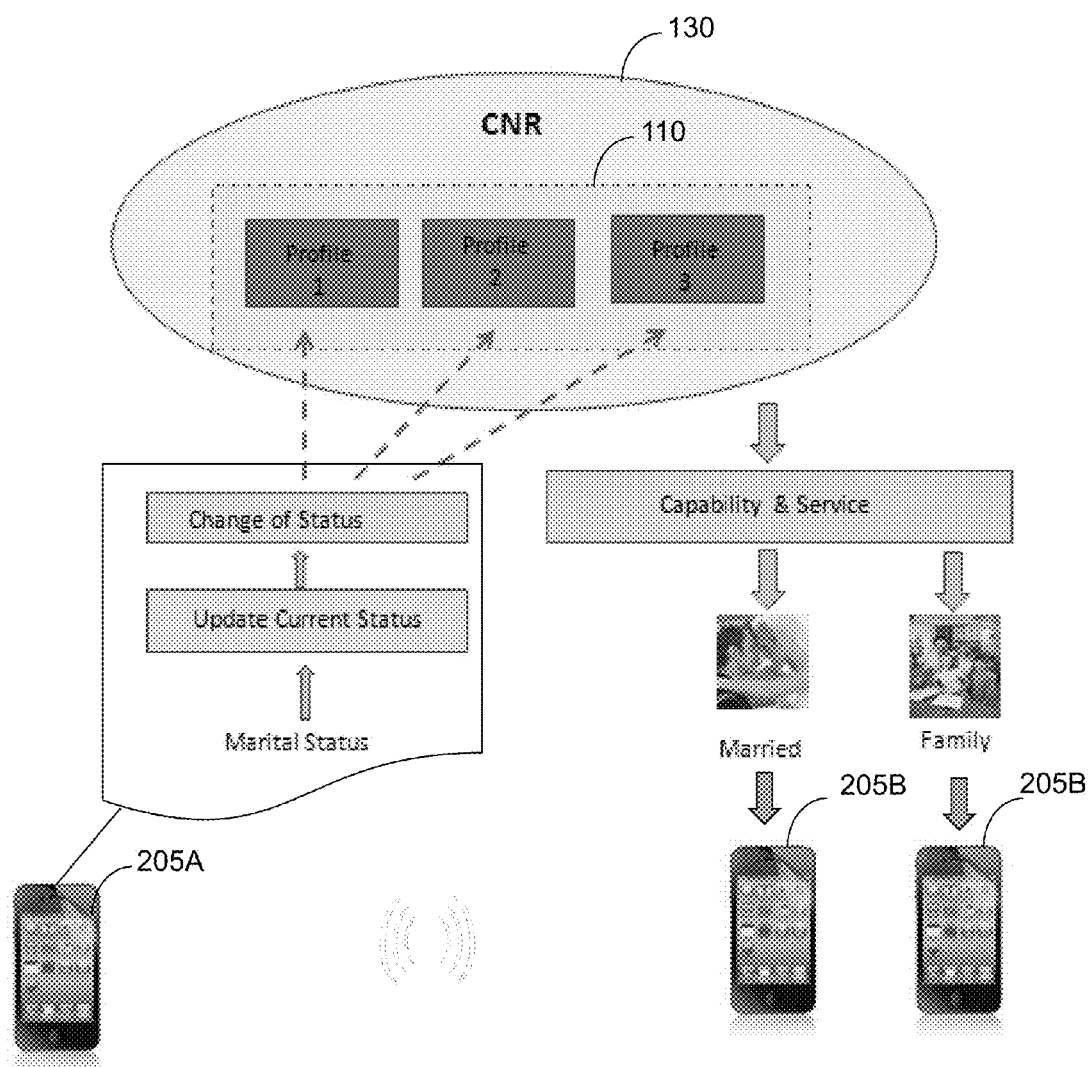

FIG. 2 depicts an illustrative embodiment of another system 200 that enables dynamic management of user profiles and status change information. The system can include the CNR 130 that stores or otherwise has access to user profiles 110. System 200 enables communication of status change information from end user device(s), such as mobile smart phone device 205A, to the CNR 130 so that the profile 110 can be adjusted and the status change information (or a portion thereof) and/or the profile adjustment can be delivered to other devices 205B of the user. Various network elements (not shown) can be utilized to facilitate the communications, including routers, switches, digital subscriber line access multiplexers (DSLAMs), service area interfaces, fiber optical links, copper twisted pairs, and so forth. The communication of the status change information from the mobile device 205A to the CNR 130 can be via a wireless link and/or a wired link. The particular access technologies utilized for communicating the status change information can vary.

System 200 also depicts direct communication between the device 205A and one or more of the devices 205B, such as via NFC. In this embodiment, the communications can be redundant such as communicating the status change information of a change in marital status to the CNR 130 as well as directly to the other user devices 205B. In other embodiments, the information and the path of communication can be selected, such as based on user preferences. For example, the device 205A can provide status change information to the CNR 130 so that the user profile 110 is generally adjusted to indicate that the user is now married, while the device 205A communicates more detailed information directly to the user's other devices 205B. By selectively communicating status change information, system 200 can provide privacy safeguards, such as only communicating sensitive status change information directly to the other user's devices 205B without providing the sensitive status change information to the CNR 130.

Figure 3:
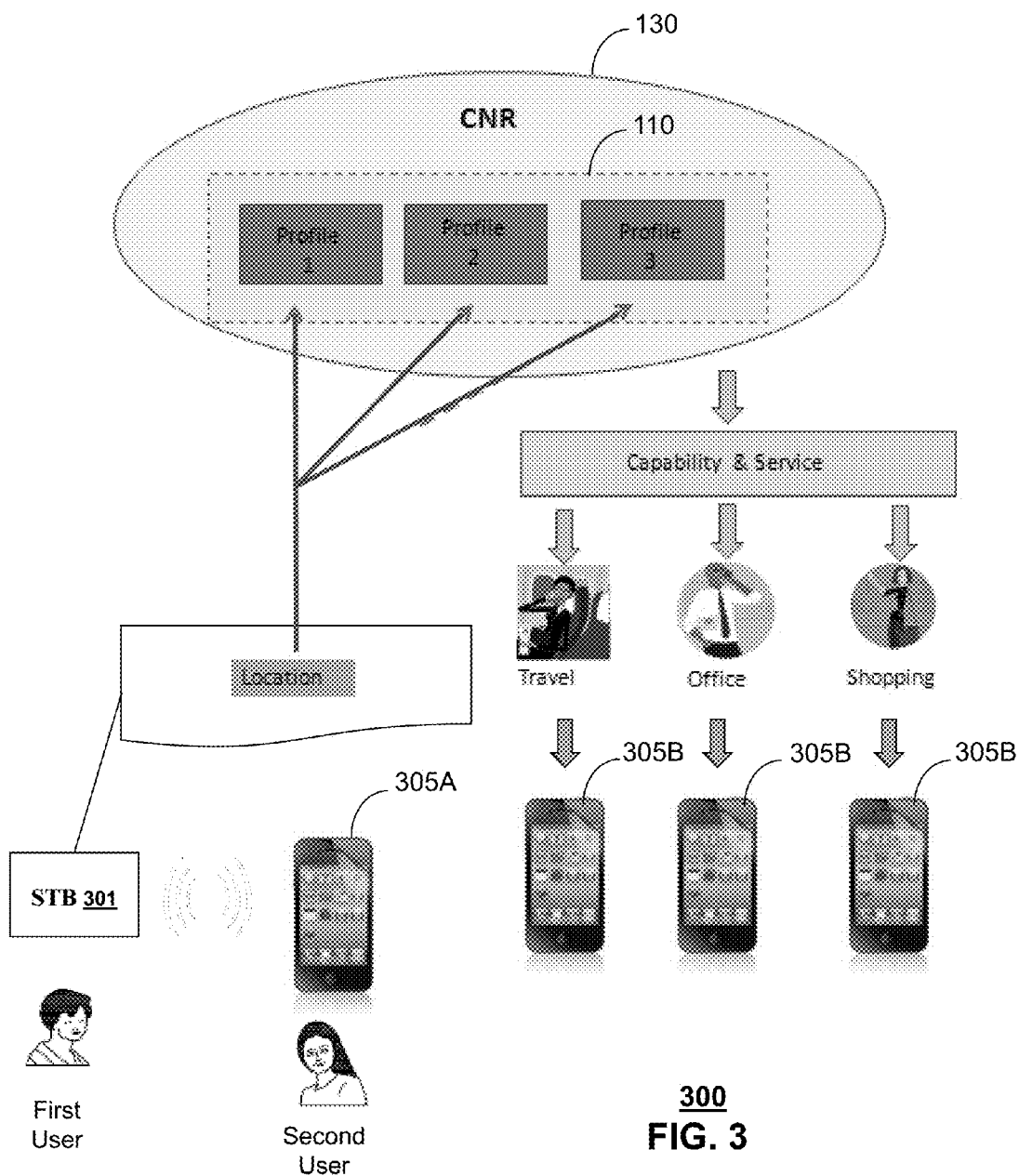

FIG. 3 depicts an illustrative embodiment of another system 300 that enables dynamic management of user profiles and status change information. The system can include the CNR 130 that stores or otherwise has access to user profiles 110. System 300 enables communication of status change information (associated with a second user) to the CNR 130 so that the profile 110 of the second user can be adjusted and the status change information (or a portion thereof) and/or the profile adjustment can be delivered to other devices 305B of the second user. Various network elements (not shown) can be utilized to facilitate the communications, including routers, switches, digital subscriber line access multiplexers (DSLAMs), service area interfaces, fiber optical links, copper twisted pairs, and so forth. The communication of the status change information to the CNR 130 can be via a wireless link and/or a wired link. The particular access technologies utilized for communicating the status change information can vary.

In this embodiment, the detection of the status change information (e.g., a location change of the second user) can be performed by a communication device (e.g., set top box 301) of a different user (e.g., the first user). For example, the second user can enter the residence of the first user and sit down to watch a movie that is being presented by the set top box 301. The set top box can detect the presence of the device 305A of the second user (e.g., based on NFC or other detection techniques). Based on the detection, the device 305A can infer that the second user is watching the movie being presented. Other data gathered by the set top box 305A can further establish the inference of the set top box, such as an amount of time the device 305A has been in proximity to the set top box, a lack of activity or movement of the device 305A that coincides with the presentation of the movie, and so forth. The set top box 301 can transmit the status change information (e.g., watching the movie at the first user's residence) to the CNR 130 so that the CNR 130 can adjust the profile 110 and push the profile adjustment or status change information to other devices 305B of the second user. As an example, the status change information can be pushed to an air conditioning system of the second user to adjust the temperature of the second user's residence since the second user will be at the first user's residence watching the movie. As another example, playlists of devices 305B can be adjusted according to the status change information to note that the second user has watched the particular movie.

In one embodiment, the set top box 301 (or another communication device of the first user such as a mobile smart phone or a home security system) can detect a second communication device of the second user in proximity to the set top box. The set top box 301 can determine status change information based on the detecting of the second communication device and based on a type of communication service being provided by the set top box at a time of the detecting of the second communication device. The set top box 301 can provide the status change information over a network to a server (e.g., CNR 130), where the status change information is associated with the second user (such as participating in a video conference call), where the set top box is not associated with the second user (e.g., the first and second users are friends that have their own devices). In this example, the providing of the status change information to the server causes the server to adjust a user profile of the second user according to the status information and causes the server to provide the status change information to a group of second communication devices 305B of the second user to enable adjusting operational parameters according to the status change information. The particular operational parameters being adjusted can vary including display parameters, access technologies selected, communication services rendered, and so forth. The adjusting of the user profile of the second user and the providing of the status change information to the group of second communication devices can be performed without user intervention by the second user. The adjusting of the user profile 110 according to the status change information can be performed in conjunction with adjustment of service(s) offered to the second user, such as providing a modified video-on-demand service to the second user at a set top box 305B of the second user according to a reduced purchase rate due to the purchase of the movie at the residence of the first user.

In one embodiment, the providing of the status change information to the server by the set top box 301 causes the server to adjust a user profile of the first user according to the status information and causes the server to provide the status change information to a group of first communication devices of the first user. For instance, the status change information not only indicates that the second user will be watching the movie but also can be indicative of the first user also watching the movie. This status change information for the first user can be pushed to devices of the first user, similar to the way the information is pushed to the devices of the second user.

In one embodiment, the adjusting of the user profile includes adjusting a group of sub-profiles that are each associated with a different persona of the particular user, wherein the adjusting can be different for each of sub-profile.

In one embodiment, an accuracy determination for the status change information submitted by the third party device can be made by the CNR 130. For example, the CNR 130 can receive or otherwise obtain verification information such as from the second communication device 305A, where the verification information is received without user intervention by the second user. The CNR 130 can analyze the verification information to determine an accuracy of the status change information associated with the second user that was determined by the first communication device, where the adjusting of the user profile of the second user and the providing of the status change information to the group of second communication devices 305B can be performed responsive to a determination by the CNR 130 that the status change information associated with the second user is accurate. As an example, the CNR 130 can obtain information indicating that the second communication device 305A had minimal movement and/or minimal device activity coinciding with the presentation of the movie by the set top box 301. This verification information can be used by the CNR 130 to determine that the status change information inferring that the second user was watching the movie is accurate.

Figure 4:
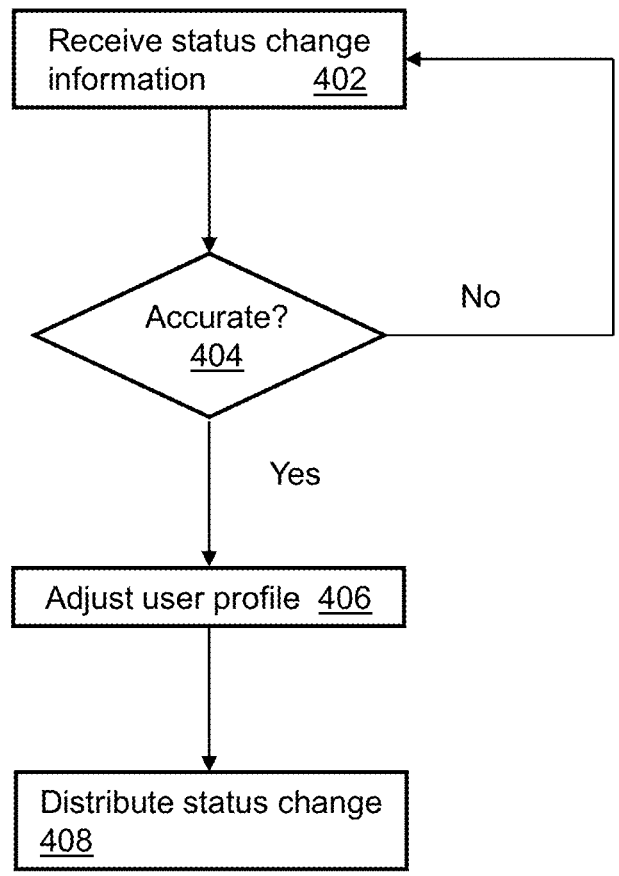
FIG. 4 depicts an illustrative embodiment of a method used in portions of the systems described in FIGS. 1-3.

FIG. 4 depicts an illustrative embodiment of a method 400 that can be used by a system or processor for dynamically managing user profiles and distributing status change information to end user devices. Method 400 can begin at 402 where a system (e.g., a network server) receives status change information. In one embodiment, the status change information can be received from a first communication device of a first user over a network, where the status change information is associated with a second communication device of a second user. In this example, the first communication device may not be associated with the second user. For instance, the first communication device can be a set top box of the first user and the second communication device can be a mobile phone of the second user where the second user is visiting the residence of the first user.

The status change information can be various types of information including location information, user preference information, user financial information, user availability information, device usage information, device capability information and so forth. In one embodiment, the status change information can be determined by the first communication device. For example, the status change information can be determined by the first communication device based on detecting the second communication device in proximity to the first communication device. In one embodiment, the determination of the status change information can be based on a type of communication service being provided by the first communication device at a time of the detecting of the second communication device. For instance, the first communication device can include a set top box, and the second communication device can include a mobile communication device. Through use of peer-to-peer communications, NFC or other detection techniques, the set top box of the first user can determine that the mobile communication device of the second user is in the vicinity of the set top box and can further determine that the set top box is currently presenting video content. An inference can be made that the second user of the mobile communication device is viewing the video content being presented. This inference can be automatically determined without user intervention by either the first user or the second user. In this example, the viewing of the video content is status change information determined by the set top box. Various factors can be used in this example for determining the inference that the second user of the mobile communication device is viewing the video content being presented, such as the length of time that the mobile communication device has been in proximity to the set top box, a comparison of the presentation time (e.g., start time and end time) of the video content with the time that the mobile communication device has been in proximity to the set top box, a comparison of time slots for commercials in the video content with time periods when the mobile communication device is outside of the proximity of the set top box, and so forth.

At 404, a determination of the accuracy of the status change information can be made by the system. For example, the system can receive verification information from the second communication device, which may or may not be received without user intervention by the second user. The system can analyze the verification information to determine an accuracy of the status change information associated with the second user that was determined by the first communication device. Continuing with this example, device activity data can be provided in the verification information to show that the second communication device was in an idle mode at the time of the determination of the status change information by the first communication device. Data indicating that the second communication device (e.g., a mobile communication device) was not being utilized provides evidence of the accuracy of the inference of the second user watching the video content, as opposed to data indicating that the second communication device was presenting its own video content at the same time which would indicate that the second user was not watching the video content being presented by the first communication device.

Other data can also be included in the verification information, such as device movement data indicating that the second communication device was not being moved at the time of the determination of the status change information by the first communication device. The verification information can also include data collected or obtained over a period of time to further facilitate determining the accuracy of the status change information. For example, data indicating that the second communication device remained in an idle mode and moved a very small distance (e.g., less than a foot) except when the second communication device moved about fifteen feet during a television commercial during a two hour movie presented by the first communication device, can be used to determine that an inference of the second user watching the two hour movie is accurate.

At 406, the system can adjust a user profile of the second user responsive to the status change information. As an example, the user profile can be stored in a memory accessible to the system, such as a central network repository. In one embodiment, the user profile can be a group of sub-profiles that are each associated with a different persona of the second user. For instance, the personas which have their own user profiles can include a work persona, a home persona, a vacation persona, a business travel persona, and so forth. In one embodiment, the adjusting of the sub-profiles of a user according to the status change information can be different for different sub-profiles of the user. As an example, status change information representing the user being on vacation can be received by the system. The system can then adjust a home persona to account for the user being on vacation, such as adjusting a temperature setting for a home and changing an emergency contact information to a neighbor. The system can also adjust a work persona to account for the user being on the vacation, such as changing an automatic email response to indicate a co-worker to be contacted. In this example, the same status change information can result in different changes to different sub-profiles.

At 408 the system can provide the status change information or a portion thereof to a group of second communication devices of the second user to cause the group of second communication devices to adjust operational parameters according to the status change information. As an example where the status change information is the second user watching a movie being presented by the first communication device, a call forwarding function of a landline phone of the second user can be temporarily disabled to accommodate the second user not being disturbed during the watching of the movie. In one or more embodiments, the adjusting of the user profile of the second user and/or the providing of the status change information to the group of second communication devices can be performed without user intervention by the second user. In one or more embodiments, the adjusting of the user profile of the second user and/or the providing of the status change information to the group of second communication devices can be performed responsive to a determination at 404 by the system that the status change information associated with the second user is accurate.

In one embodiment, the different persona of the second user can associated with different sets of end user devices of the second user, where the sets are mutually exclusive or include devices in both sets. In one embodiment, the adjusting of the operational parameters of one or more of the group of second communication devices enables access to a communication service that was unavailable at the group of second communication devices prior to the adjusting of the user profile of the second user.

In one embodiment, one or more third communication devices of the second user can receive the status change information according to a pull distribution method. For example, the system can receive a status update request from a third communication device of the second user, and can provide the status change information or a portion thereof to the third communication device to cause the third communication device to adjust operational parameters according to the status change information. In this example, the receiving of the status update request and the providing of the status change information can be performed without user intervention by the second user.

In one embodiment, the status change information can be utilized for adjusting a user profile of the first user. For example, the first communication device can determine that the second user is watching video content being presented by the first communication device of the first user. The user profile of the first user can be updated according to this status change information, such as based on an inference that the first and second users are together watching the video content. Other information can also be used to verify this inference, such as determining from a mobile device of the first user that the first user appears to be in the same location as the mobile device of the second user (which in this example is in proximity to the set top box presenting the video content). In this example, a plurality of status change information can be determined for different users and then analyzed by the system to detect (or otherwise determine an accuracy of) an activity relationship between the different users. Continuing with this example, the status change information for the first user can be distributed to first communication devices of the first user so that operational parameters of the group of first devices are adjusted according to the status change information, such as temporarily disabling features on those first communication devices that would disturb the first user during the presentation of the video content. In this example, the adjusting of the user profile of the first user and the providing of the status change information to the group of first communication devices can be performed without user intervention by the first or second user.

Figure 5:
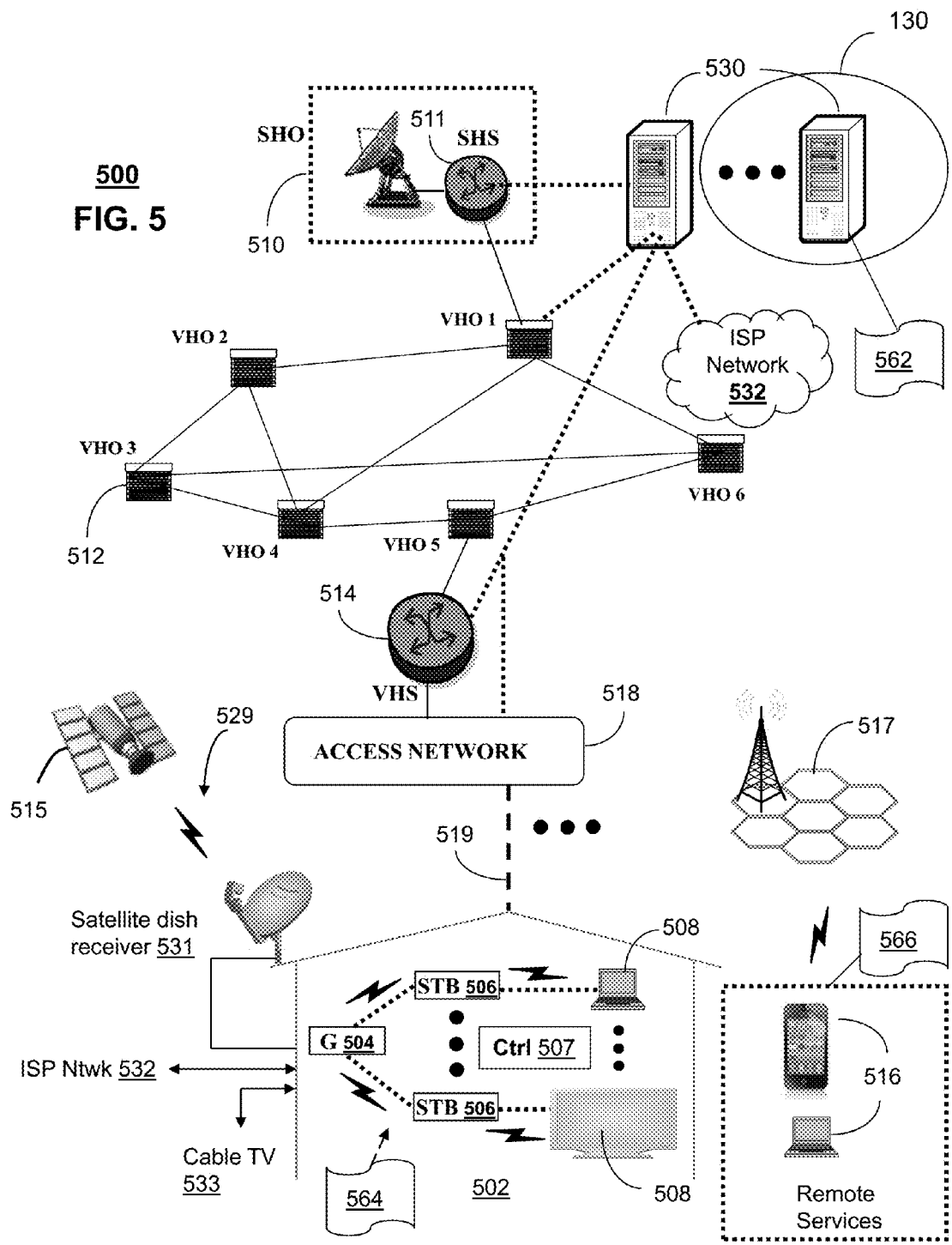
FIG. 5 depict illustrative embodiments of communication systems that provide media services and dynamic management of user profiles.

FIG. 5 depicts an illustrative embodiment of a communication system 500 for delivering media content and providing communication services to users. The communication system 500 can represent an Internet Protocol Television (IPTV) media system. Communication system 500 can be overlaid or operably coupled with systems 100-300 of FIGS. 1-3 as other representative embodiments of communication system 500. For instance, one or more devices illustrated in the communication system 500 of FIG. 5 can enable dynamically managing user profiles and status change information, such as by providing a dynamic CNR profile system that allows the CNR to automatically follow a current status of a user without user intervention. The CNR can store the user profile(s) and provide for interaction with the CNR for adjusting with the changing status of the user. The CNR can push the appropriate profile and/or parameters to enable the applications and/or devices of the user to accommodate the change of status, preference, and/or location of the user.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as the CNR 130. The server 530 can use computing and communication technology to perform function 562, which can include among other things, receiving status change information from a first communication device of a first user over a network where the status change information is determined by the first communication device where the status change information is associated with a second user and where the first communication device not being associated with the second user; adjusting a user profile of the second user responsive to the status change information where the user profile being stored in a memory accessible to the system; and providing the status change information to a group of second communication devices of the second user to cause the group of second communication devices to adjust operational parameters according to the status change information, where the adjusting of the user profile of the second user and the providing of the status change information to the group of second communication devices is performed without user intervention by the second user.

For instance, function 562 of server 530 can be similar to the functions described for CNR 130 of systems 100-300, as well as the steps described in method 400. The media processors 506 and wireless communication devices 516 can be provisioned with software functions 564 and 566, respectively, to utilize the services of server 530. For instance, functions 564 and 566 of media processors 506 and wireless communication devices 516 can be similar to the functions described for the communication devices 105, 205, 301 and 305 of systems 100-300. For example, functions 564 can include detecting a second communication device of a second user in proximity to the first communication device; determining status change information based on the detecting of the second communication device and based on a type of communication service being provided by the first communication device at a time of the detecting of the second communication device; and providing the status change information over a network to a server where the status change information is associated with the second user where the first communication device is not associated with the second user where the providing of the status change information to the server causes the server to adjust a user profile of the second user according to the status information and causes the server to provide the status change information to a group of second communication devices of the second user to enable adjusting operational parameters according to the status change information, and where the adjusting of the user profile of the second user and the providing of the status change information to the group of second communication devices is performed without user intervention by the second user.

As another example, functions 566 can include providing communication signals that enable a first communication device to detect the second communication device in proximity to the first communication device where a detection of the second communication device in proximity to the first communication device causes the first communication device to determine status change information for a second user of the second communication device and where a determination of the status change information causes the first communication device to provide the status change information to a server for adjusting a user profile of the second user according to the status information and for providing the status change information to a group of second communication devices of the second user to enable adjusting operational parameters according to the status change information; and providing verification information to the server without user intervention by the second user where the providing of the verification information causes the server to determine an accuracy of the status change information associated with the second user that was determined by the first communication device, where the adjusting of the user profile of the second user and the providing of the status change information to the group of second communication devices is performed responsive to a determination by the server that the status change information associated with the second user is accurate.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In one or more embodiments, an IP Multimedia Subsystem (IMS) network architecture can be employed to facilitate the combined services of circuit-switched and packet-switched systems.

Figure 6:
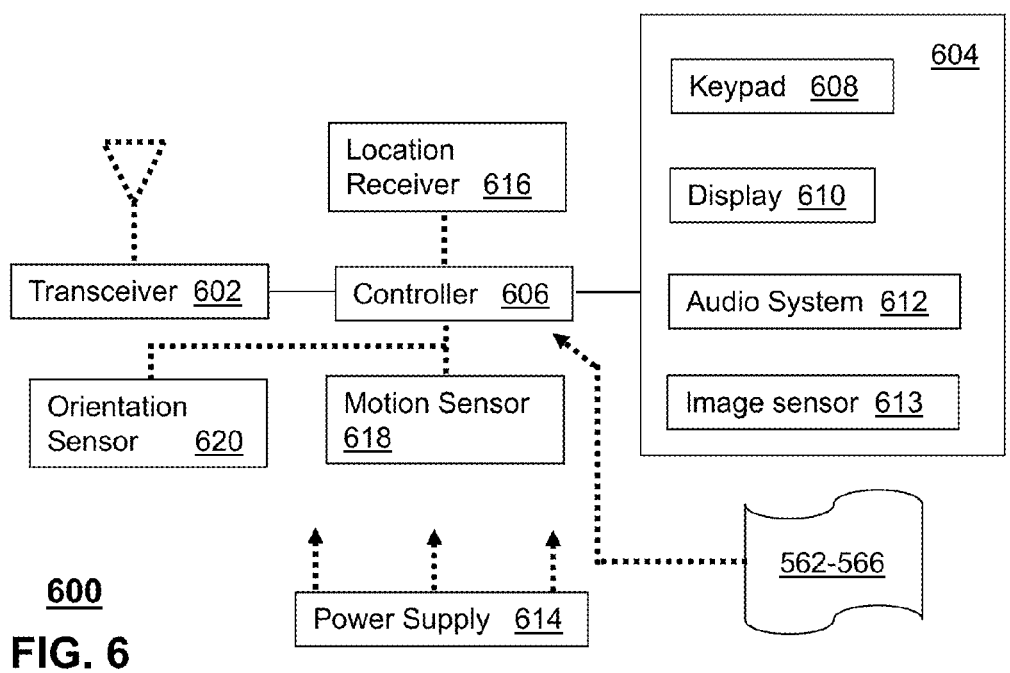
FIG. 6 depicts an illustrative embodiment of a communication device.

FIG. 6 depicts an illustrative embodiment of a communication device 600. Communication device 600 can serve in whole or in part as an illustrative embodiment of the devices depicted in systems 100-300 and 500 and can be configured to perform all or portions of method 400. Communication device 600 can detect a second communication device of a second user in proximity to the first communication device; determine status change information based on the detecting of the second communication device and based on a type of communication service being provided by the first communication device at a time of the detecting of the second communication device; and provide the status change information over a network to a server, where the status change information is associated with the second user, the first communication device not being associated with the second user, where the providing of the status change information to the server causes the server to adjust a user profile of the second user according to the status information and causes the server to provide the status change information to a group of second communication devices of the second user to enable adjusting operational parameters according to the status change information, and where the adjusting of the user profile of the second user and the providing of the status change information to the group of second communication devices is performed without user intervention by the second user.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices 105, 130, 205, 301, 305, the media processor 506, the media devices 508, or the portable communication devices 516 of FIG. 5. It will be appreciated that the communication device 600 can also represent other devices that can operate in system 100-300 and 500 such as a gaming console and a media player. The controller 606 can be adapted in various embodiments to perform the functions 562-566, respectively.

Upon reviewing the aforementioned embodiments, it would be evident to an artisan with ordinary skill in the art that said embodiments can be modified, reduced, or enhanced without departing from the scope of the claims described below. For example, filtering can be applied to the distribution of the status change information and/or the profile updates. For instance, certain user devices that are shared with other users (e.g., shared with family members) can receive less detail of the status change information and/or the profile updates. In one embodiment, the pushing of services can be limited to certain devices of the user, such as based on user preferences, cost associated with accessing the service from the particular device, and so forth.

In one embodiment, the accuracy determination can be based on a weighting system, such as verification information of a first type or from a first source having a higher weight that a second type of from a second source. In one embodiment, a history of accuracy can be utilized in determining the accuracy of the status change information. For instance, the CNR 130 can monitor status change determination by a device and feedback with respect to those determinations (e.g., feedback received from the second user). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
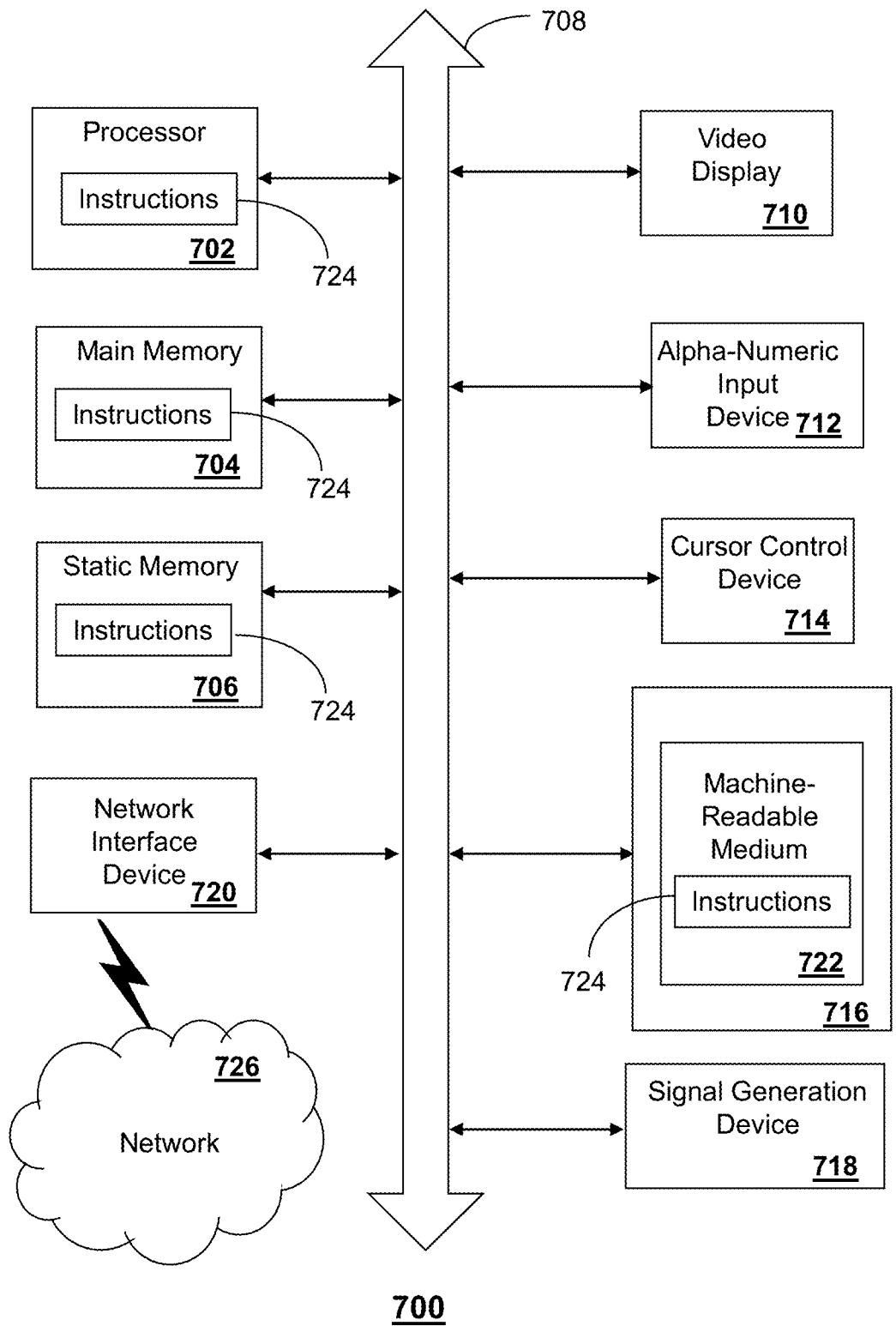
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the CNR 130, the end user devices 105, 205, 301, 305, the media processor 406 and other devices of system 100-300 and 500 for dynamically managing user profiles and status change information to provide a dynamic CNR profile system that enables the CNR to automatically follow a current status of a user without user intervention In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a system including a processor, status change information from a first communication device of a first user over a network, the status change information being determined by the first communication device, the status change information being associated with a second user, the first communication device not being associated with the second user, wherein the status change information is determined by the first communication device based on detecting a second communication device of a group of second communication devices being in proximity to the first communication device and based on a type of communication service being provided by the first communication device at a time of the detecting of the second communication device;

adjusting, by the system, a user profile of the second user responsive to the status change information, the user profile being stored in a memory accessible to the system; and providing, by the system, the status change information to the group of second communication devices of the second user to cause the group of second communication devices to adjust operational parameters according to the status change information, wherein the adjusting of the user profile of the second user and the providing of the status change information to the group of second communication devices is performed without user intervention by the second user.

2. The method of claim 1, wherein the adjusting of the operational parameters of the group of second communication devices enables access to a communication service that was unavailable at the group of second communication devices prior to the adjusting of the user profile of the second user.

3. The method of claim 1, further comprising:

receiving, by the system, verification information from the second communication device, the verification information being received without user intervention by the second user; and analyzing, by the system, the verification information to determine an accuracy of the status change information associated with the second user that was determined by the first communication device, wherein the adjusting of the user profile of the second user and the providing of the status change information to the group of second communication devices is performed responsive to a determination by the system that the status change information associated with the second user is accurate.

4. The method of claim 1, further comprising:
receiving, by the system, a request for status update from a third communication device of the second user; and
providing, by the system, the status change information to the third communication device to cause the third communication device to adjust operational parameters according to the status change information,
wherein the receiving of the request for status update and the providing of the status change information is performed without user intervention by the second user.

5. The method of claim 1, wherein the adjusting of the user profile of the second user comprises adjusting a group of user profiles that are each associated with a different persona of the second user, wherein the adjusting of the group of user profiles according to the status change information is different for each of the group of user profiles.

6. The method of claim 1, wherein the first communication device comprises a set top box, and wherein the second communication device comprises a mobile communication device.

7. The method of claim 5, wherein the different persona of the second user are associated with different sets of end user devices of the second user.

8. The method of claim 1, comprising:
adjusting, by the system, a second user profile of the first user responsive to the status change information, the second user profile being stored in the memory accessible to the system; and
providing, by the system, the status change information to a group of first communication devices of the first user to cause the group of first communication devices to adjust second operational parameters according to the status change information, wherein the adjusting of the second user profile of the first user and the providing of the status change information to the group of first communication devices is performed without user intervention by the first user.

9. A first communication device, comprising:
a processor; and
a memory that stores executable instructions that, when executed by the processor, facilitate performance of operations, comprising:
detecting a second communication device of a second user in proximity to the first communication device, wherein the detecting of the second communication device in proximity to the first communication device is according to wireless communications between the first and second communication devices;
determining status change information based on the detecting of the second communication device and based on a type of communication service being utilized by the first communication device at a time of the detecting of the second communication device; and
providing the status change information over a network to a server, the status change information being associated with the second user, the first communication device not being associated with the second user, wherein the providing of the status change information to the server causes the server to adjust a user profile of the second user according to the status change information and causes the server to provide the status change information to a group of second communication devices of the second user to enable adjusting operational parameters according to the status change information,
wherein the adjusting of the user profile of the second user and the providing of the status change information to the group of second communication devices is performed without user intervention by the second user.

10. The first communication device of claim 9, comprising a set top box, wherein the second communication device comprises a mobile communication device, and wherein the type of communication service being utilized by the first communication device at the time of the detecting of the second communication device comprises presenting video content.

11. The first communication device of claim 9, wherein the providing of the status change information to the server causes the server to adjust a second user profile of a first user of the first communication device according to the status change information and causes the server to provide the status change information to a group of first communication devices of the first user.

12. The first communication device of claim 11, wherein the adjusting of the second user profile of the first user comprises adjusting a group of other user profiles that are each associated with a different persona of the first user, wherein the adjusting of the group of other user profiles according to the status change information is different for each of the group of other user profiles.

13. The first communication device of claim 12, wherein the different persona of the first user comprise a work persona and a home persona, wherein the first communication device comprises a set top box, and wherein the second communication device comprises a mobile communication device.

14. A machine-readable storage medium, comprising executable instructions that, when executed by a processor of a second communication device, facilitate performance of operations, comprising:
providing communication signals that enable a first communication device to detect the second communication device in proximity to the first communication device, wherein a detection of the second communication device in proximity to the first communication device causes the first communication device to determine status change information for a second user of the second communication device, and wherein a determination of the status change information causes the first communication device to provide the status change information to a server for adjusting a user profile of the second user according to the status change information and for providing the status change information to a group of second communication devices of the second user to enable adjusting operational parameters according to the status change information, wherein the determination of the status change information for the second user is based on a type of communication service being utilized by the first communication device at a time of the detecting of the second communication device; and
providing verification information to the server without user intervention by the second user, wherein the providing of the verification information causes the server to make a second determination of an accuracy of the status change information associated with the second user that was determined by the first communication device, wherein the adjusting of the user profile of the second user and the providing of the status change information to the group of second communication devices is performed responsive to the second determination by the server that the status change information associated with the second user is accurate.

15. The machine-readable storage medium of claim 14, wherein the operations further comprise:

receiving the status change information of the second user from the server; and adjusting the operational parameters of the second communication device according to the status change information to enable access to a communication service that was unavailable at the second communication device prior to the adjusting of the user profile of the second user.

16. The machine-readable storage medium of claim 14, wherein the adjusting of the user profile of the second user comprises adjusting a group of user profiles that are each associated with a different persona of the second user, and wherein the adjusting of the group of user profiles according to the status change information is different for each of the group of user profiles.

17. The machine-readable storage medium of claim 16, wherein the different persona of the second user comprise a work persona and a home persona, wherein the first communication device comprises a set top box, and wherein the second communication device comprises a mobile communication device.

* * * * *